(12) United States Patent
Kobayashi

(10) Patent No.: US 7,864,341 B2
(45) Date of Patent: Jan. 4, 2011

(54) COORDINATE DETECTION APPARATUS AND METHOD, AND COMPUTER PROGRAM

(75) Inventor: Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 12/165,000

(22) Filed: Jun. 30, 2008

(65) Prior Publication Data

US 2009/0027694 A1 Jan. 29, 2009

(30) Foreign Application Priority Data

Jul. 23, 2007 (JP) .............................. 2007-191219

(51) Int. Cl.
*G01B 11/14* (2006.01)

(52) U.S. Cl. ................... 356/614; 356/622; 345/175; 345/174

(58) Field of Classification Search ......... 356/614–623; 345/175, 173, 156, 172, 157, 174, 158; 250/221
See application file for complete search history.

(56) References Cited

U.S. PATENT DOCUMENTS

| 4,507,557 | A | 3/1985 | Tsikos | |
|---|---|---|---|---|
| 6,429,856 | B1 | 8/2002 | Omura et al. | |
| 6,563,491 | B1* | 5/2003 | Omura | 345/173 |
| 6,570,103 | B1 | 5/2003 | Saka et al. | |
| 6,717,684 | B1* | 4/2004 | Fikes et al. | 356/614 |
| 6,791,700 | B2* | 9/2004 | Omura et al. | 356/620 |
| 7,015,894 | B2* | 3/2006 | Morohoshi | 345/156 |
| 7,283,128 | B2* | 10/2007 | Sato | 345/173 |
| 2005/0200612 | A1* | 9/2005 | Tanaka et al. | 345/175 |
| 2005/0200613 | A1* | 9/2005 | Kobayashi et al. | 345/175 |
| 2006/0012579 | A1 | 1/2006 | Sato | |
| 2006/0232792 | A1* | 10/2006 | Kobayashi | 356/621 |
| 2009/0295755 | A1* | 12/2009 | Chapman et al. | 345/175 |

FOREIGN PATENT DOCUMENTS

| JP | 402137013 A | * 5/1990 |
|---|---|---|
| JP | 2000-347798 | 12/2000 |
| JP | 2001-043019 | 2/2001 |
| JP | 2005-078433 | 3/2005 |

* cited by examiner

*Primary Examiner*—Hoa Q Pham
(74) *Attorney, Agent, or Firm*—Cowan, Liebowitz & Latman, P.C.

(57) ABSTRACT

A coordinate detection apparatus has a light projecting unit and light receiving unit, detects abnormal light based on the output from the light receiving unit in a state in which the light projecting unit does not project any light, and detects the coordinates of a light-shielded position based on the output from the light receiving unit in a state in which the light projecting unit projects light.

27 Claims, 10 Drawing Sheets

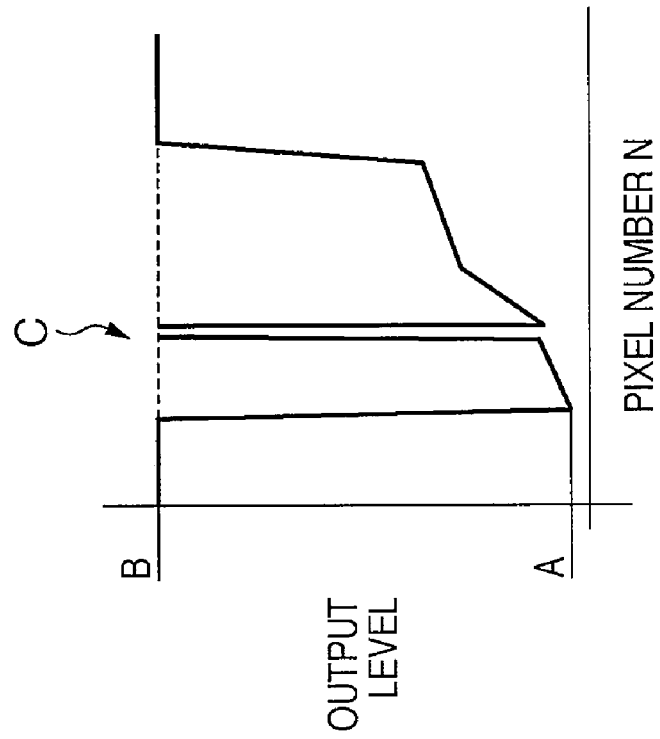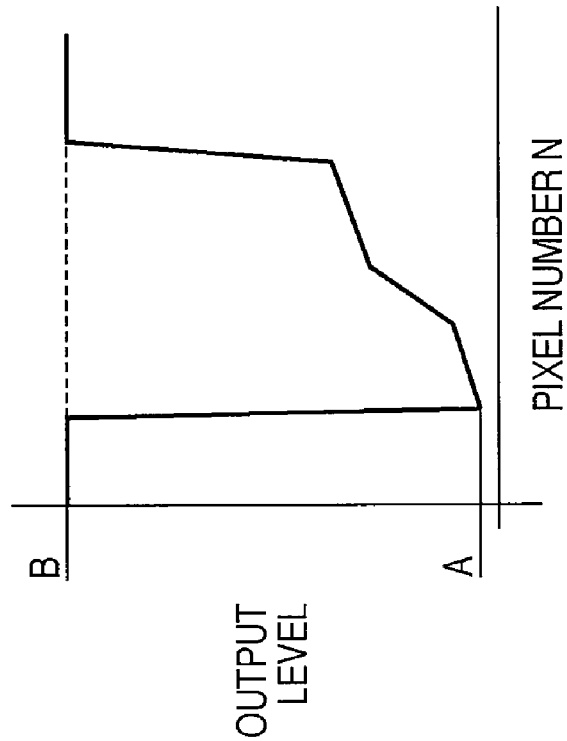

COORDINATE DETECTION APPARATUS AND METHOD, AND COMPUTER PROGRAM

BACKGROUND OF THE INVENTION

1. Field of the Invention

The present invention relates to a coordinate detection apparatus and method, which detect the coordinates of a light-shielded position, and a computer program.

2. Description of the Related Art

A coordinate input apparatus which controls a connected computer or writes characters, figures, and the like by inputting coordinates by pointing to a coordinate input surface using a pointer (e.g., a dedicated input pen, finger, or the like) is known.

Conventionally, various types of such coordinate input apparatuses are proposed or commercially available as touch panels to manipulate terminals such as personal computers or the like on the screen.

Various coordinate input methods such as a method using a resistive film, that using ultrasonic waves, and the like are available. For example, Japanese Patent Laid-Open No. 2005-078433 proposes the following coordinate input apparatus. That is, a light emitting unit is provided to the tip portion of a pointer as a dedicated writing material, a light source of the pointer emits light by a touch input operation by that pointer, and that light is detected by light receiving units provided to the corners around a coordinate input effective region, thereby calculating a touch input position of the writing material.

As an apparatus using light, for example, U.S. Pat. No. 4,507,557 is available. U.S. Pat. No. 4,507,557 discloses the following arrangement. That is, a retroreflecting sheet is arranged outside a coordinate input effective region, and illumination units for illuminating light and light receiving units for receiving light, which are arranged at the corners of the coordinate input effective region, detect angles between the light receiving units and an object such as a finger or the like, which shields light, within the coordinate input effective region. Based on the detection result, the pointed position of the object is decided.

U.S. Pat. Nos. 6,429,856, 6,570,103, and the like disclose coordinate input apparatuses, which detect the coordinates of a part (light-shielded part) where retroreflecting light is shielded by arranging retroreflecting members around a coordinate input effective region.

In these apparatuses, for example, in U.S. Pat. No. 6,429,856, the peak of a light-shielded part by an object, which is received by light receiving units, is detected by waveform processing arithmetic operations such as differentiation and the like to detect the angles of the light-shielded part with respect to the light receiving units, and the coordinates of the object are calculated based on the detection result. U.S. Pat. No. 6,570,103 discloses an arrangement in which one end and the other end of a light-shielded part are detected by comparing with a specific level pattern, and the center of these coordinates is detected.

A method that calculates coordinates by detecting a light-shielded position like U.S. Pat. Nos. 4,507,557, 6,429,856, and 6,570,103 will be referred to as a light-shielding method hereinafter.

Japanese Patent Laid-Open No. 2000-347798 discloses a coordinate input apparatus in which a retroreflecting sheet is provided outside a coordinate input surface of this type and reflects light coming from illumination units that illuminate light, and light receiving units detect light amount distributions, thereby detecting the light-shielded position. In the arrangement described in this reference, the coordinate input apparatus comprises a detection unit which detects dust inside a coordinate detection effective region or contamination of the retroreflecting sheet, and outputs an input error signal to prevent malfunctions when this detection unit detects dust or contamination.

Japanese Patent Laid-Open No. 2001-043019 discloses an arrangement which has an arithmetic unit that diagnoses whether or not a coordinate detection result is normal, and in which this arithmetic unit comprises a storage unit for storing reference data used in self diagnosis, and executes self diagnosis by comparing the reference data with self diagnosis data based on reflected light.

The coordinate input apparatus that adopts the light-shielding method acquires base data in a state without any illumination of illumination units, and reference data corresponding to initial light amount distributions in a state with illumination of the illumination units, and stores them in a memory. The apparatus samples light amount distributions used to detect a light-shielded position, and calculates the light-shielded position based on three data, that is, the sampled light amount distributions, and the previously stored base data and reference data. By acquiring the base data and reference data upon power ON, and calculating a light-shielded position using these data, an effect of absorbing individual differences of CCD pixels that form light receiving units, and an effect of eliminating the influence of ambient light of an installation environment are obtained. In addition, an effect of absorbing a change in characteristic due to aging of the coordinate input apparatus, and an effect of eliminating the influence resulting from attachment of dust to the light receiving units due to aging are obtained.

However, during use after acquisition of the base data and reference data upon power ON, if this signal has changed due to the influence of some kind, the coordinate input apparatus malfunctions. For example, in an environment including ambient light such as an incandescent lamp, spotlight, or the like in the installation environment of the apparatus, if a light source as that ambient light is turned off or the position of the light source is changed during use, the current state becomes different from the environment upon power ON. That is, the environment upon power ON is different from that during use. For this reason, when a light-shielded position to be acquired during use is calculated using the base data and reference data acquired upon power ON, the detected position coordinates may include errors or the apparatus may malfunction.

SUMMARY OF THE INVENTION

It is an object of the present invention to solve the aforementioned problems.

It is another object of the present invention to detect a state that does not allow normal detection.

It is still another object of the present invention is to provide a coordinate detection apparatus for detecting coordinates of a light-shielded position, comprising: light projecting means; light receiving means; and detection means for detecting abnormal light based on an output from the light receiving means in a state in which the light projecting means does not project any light, and for detecting coordinates of a light-shielded position based on an output from the light receiving means in a state in which the light projecting means projects light.

It is yet another object of the present invention is to provide a coordinate detection apparatus for detecting coordinates of a light-shielded position, comprising: light projecting means;

light receiving means; and detection means for detecting abnormal light, which is projected from a light source other than the light projecting means and is input to the light receiving means, based on an output from the light receiving means in a state in which the light projecting means projects light, and for detecting coordinates of a light-shielded position based on an output from the light receiving means in the state in which the light projecting means projects light.

Further features of the present invention will become apparent from the following description of exemplary embodiments with reference to the attached drawings.

BRIEF DESCRIPTION OF THE DRAWINGS

FIGS. 3A and 3B are graphs showing examples of light amount distributions obtained by sensor units according to the embodiment of the present invention;

DESCRIPTION OF THE EMBODIMENTS

Embodiments of the present invention will be described in detail hereinafter with reference to the drawings.

<General Description of Apparatus Arrangement>

The schematic arrangement of a whole coordinate input apparatus will be described first with reference to FIG. 1.

Figure 1:
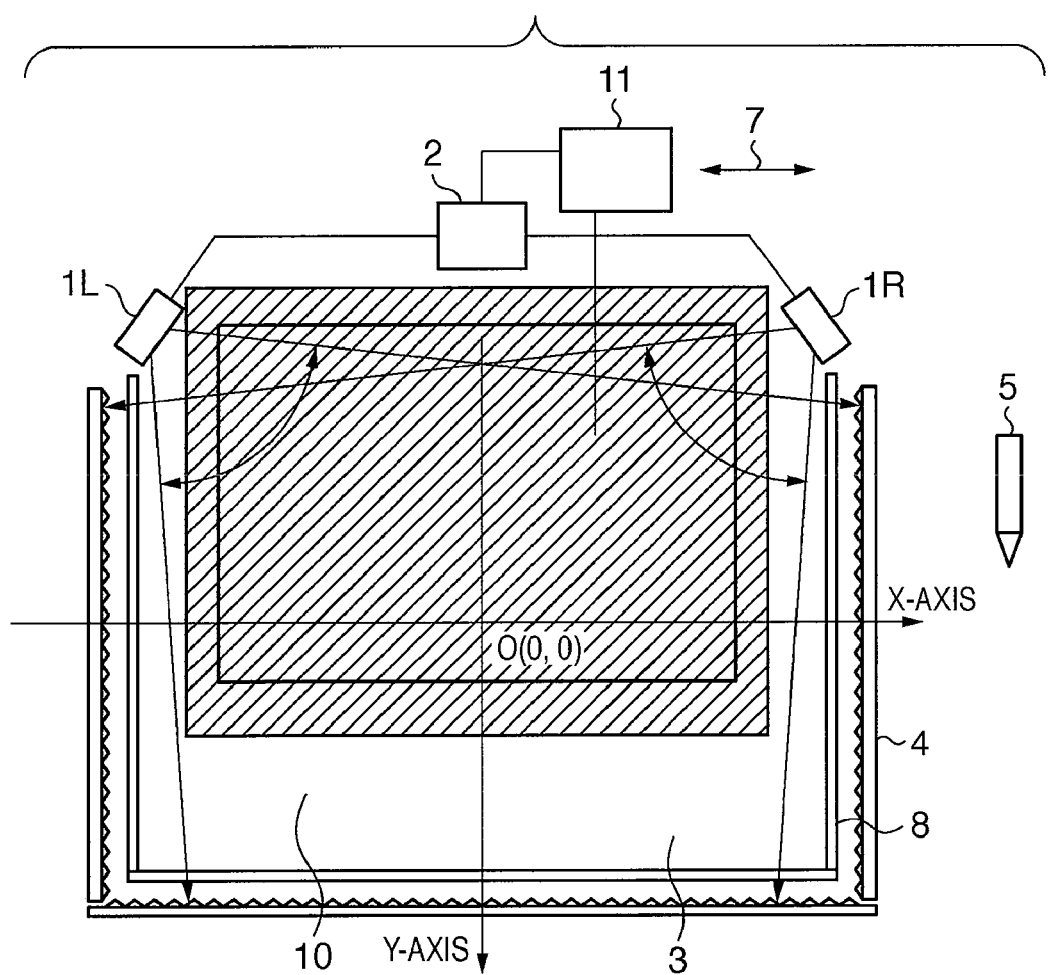
FIG. 1 is a schematic view showing the arrangement of a coordinate input apparatus that adopts the light-shielding method according to an embodiment of the present invention.

FIG. 1 is a schematic view showing the arrangement of a coordinate input apparatus that adopts the light-shielding method according to an embodiment of the present invention.

Referring to FIG. 1, reference numerals 1L and 1R denote sensor units each having a light projecting unit and a detection unit (a light receiving unit). In case of this embodiment, the sensor units 1L and 1R are arranged at positions parallel to an X-axis and symmetrical about a Y-axis of a coordinate input effective region 3 (hatched part in FIG. 1) as a coordinate input surface to be separated by a predetermined distance, as shown in FIG. 1. The sensor units 1L and 1R are connected to a control and arithmetic unit 2. The sensor units 1L and 1R receive control signals from the control and arithmetic unit 2, and send detected signals to the control and arithmetic unit 2.

The arrangements of the light projecting units and detection units of the sensor units 1L and 1R are shown in FIGS. 3A and 3B and FIGS. 4 and 5 of U.S. Patent Application Publication No. 2006-12579.

Reference numeral 4 denotes retroreflecting members which have retroreflecting surfaces for retroreflecting incident light in incoming directions, and are arranged on surrounding portions (three surrounding sides) of the coordinate input effective region 3. The retroreflecting members 4 retroreflect light projected from the left and right sensor units 1L and 1R within about 90° ranges (those indicated by arrows in FIG. 1) toward the sensor units 1L and 1R.

Note that each retroreflecting member 4 has a microscopically three-dimensional structure, and a retroreflecting tape of a bead type, and a retroreflecting tape that causes a recurrence phenomenon by regularly arranging corner cubes by a machining process or the like are currently known.

Reference numeral 8 denotes light transmitting members which can transmit light of only a specific wavelength, prevent transmission of unwanted light components, and prevent the retroreflecting members 4 from directly exposing to the outer appearance. With this arrangement, when the apparatus is used as a product, dirt and dust deposited on the light transmitting members 8 can be removed when the user, for example, wipes the light transmitting members 8.

Light components retroreflected by the retroreflecting members 4 are linearly detected by the sensor units 1L and 1R and light amount distributions of the detected light are sent to the control and arithmetic unit 2.

The coordinate input effective region 3 is formed on a display screen of a display device 10 (connected to an external terminal as a coordinate output destination) such as a PDP, rear projector, LCD panel or the like, or on a screen of a front projector.

With such arrangement, when an input instruction by a finger or a pointer 5 is made on the coordinate input effective region 3, light components projected from the light projecting units of the sensor units 1L and 1R are shielded (a light-shielded part). As a result, since the detection units of the sensor units 1L and 1R cannot detect light of that light-shielded part (reflected light by retroreflection), they can determine directions from which light cannot be detected.

Thus, the control and arithmetic unit 2 detects a light-shielded range of the input instruction part by the pointer 5 from light amount changes detected by the left and right sensor units 1L and 1R. The control and arithmetic unit 2 calculates directions (pointer angles) of the light-shielded position with respect to the sensor units 1L and 1R.

The control and arithmetic unit 2 then geometrically calculates the light-shielded position of the pointer (pointed position) on the coordinate input effective region 3 based on the calculated directions (angles), distance information between the sensor units 1L and 1R, and the like. The control and arithmetic unit 2 outputs a coordinate value corresponding to the calculated light-shielded position to a display control unit 11 connected to the display device 10, or outputs it to an external terminal such as a host computer or the like via an interface 7 (e.g., USB, IEEE1394, etc.).

The display control unit 11 performs a predetermined operation (modification of information) based on the obtained coordinate value, and operates to display that result. Furthermore, the display control unit 11 executes control for displaying an image upon setting a work area, and control for converting the detected coordinate value. Alternatively, the external terminal may execute such control.

In this way, manipulations of the external terminal such as drawing of lines on the screen, a manipulation of an icon displayed on the display device, and so forth using the pointer 5 can be made.

The control and arithmetic unit 2 and sensor units 1L and 1R mainly exchange CCD control signals and CCD clock signals for line CCDs in the detection units arranged in the sensor units 1L and 1R, and output signals, and also drive signals of infrared LEDs in the light projecting units arranged in the sensor units 1L and 1R.

The detailed arrangement of the control and arithmetic unit 2 will be described below with reference to FIG. 2.

Figure 2:
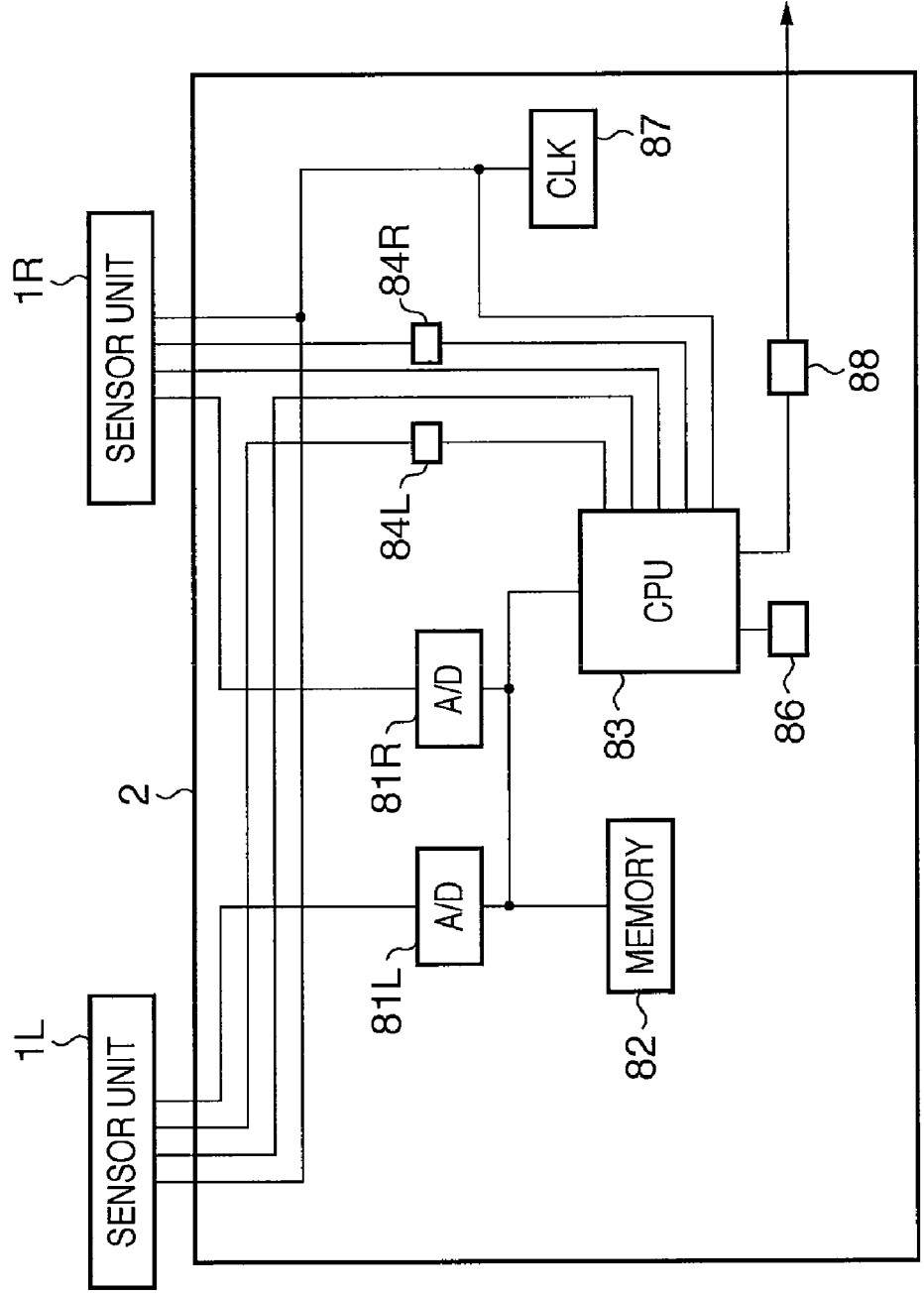
FIG. 2 is a block diagram showing the detailed arrangement of a control and arithmetic unit according to the embodiment of the present invention.

FIG. 2 is a block diagram showing the detailed arrangement of a control and arithmetic unit according to the embodiment of the present invention.

An arithmetic control circuit (CPU) 83, which comprises a one-chip microcomputer and the like, outputs CCD control signals, which are used to implement shutter timing control, data output control, and the like of the line CCDs in the detection units arranged in the sensor units 1L and 1R.

Note that this arithmetic control circuit 83 operates according to clock signals from a main clock generation circuit 86. A clock generation circuit (CLK) 87 sends CCD clock signals to the sensor units 1L and 1R, and also inputs them to the arithmetic control circuit 83 to execute various kinds of control in synchronism with the line CCDs in the sensor units.

The arithmetic control circuit 83 supplies LED drive signals for driving the infrared LEDs in the light projecting units arranged in the sensor units 1L and 1R to the infrared LEDs in the light projecting units arranged in the corresponding sensor units 1L and 1R via LED driving circuits 84L and 84R.

Detection signals from the line CCDs in the detection units of the sensor units 1L and 1R are input to corresponding A/D converters 81L and 81R in the control and arithmetic unit 2, and are converted into digital values under the control of the arithmetic control circuit 83. The converted digital values are stored in a memory 82, and are used in angle calculations of the pointer. A coordinate value is calculated from the calculated angles, and is output to the external terminal via a serial interface 88 (e.g., USB, RS232C interface, etc.).

<Description of Light Amount Distribution Detection>

A timing chart of the CCD control signals and drive signals of the light projecting units is common to FIG. 9 of U.S. Patent Application Publication No. 2006-12579.

Based on the detection signals read out from both the sensor units 1L and 1R, a light amount distribution shown in FIG. 3A is obtained as the output from each sensor unit when there is no input to the coordinate input effective region 3 using the pointer. Of course, such light amount distribution is not always obtained by all systems. The light amount distribution changes depending on the characteristics of the retroreflecting members 4 (for example, the retroreflecting characteristics of the retroreflecting members 4 depending on incidence angles), those of the light projecting units, and aging (contamination on a reflecting surface, etc.).

In FIG. 3A, level A is a maximum light amount, and level B is a minimum light amount.

That is, in a state in which there is no reflected light from the retroreflecting members 4, the light amount level obtained by the sensor units 1L and 1R is around level B. As the reflected light amount increases, the light amount level shifts toward level A. In this way, the detection signals output from the sensor units 1L and 1R are sequentially A/D-converted by the corresponding A/D converters 81L and 81R, and are sampled by the arithmetic control circuit 83 as digital data.

By contrast, when there is an input to the coordinate input effective region 3 using the pointer, a light amount distribution shown in FIG. 3B is obtained as the output from each of the sensor units 1L and 1R.

In a part C of this light amount distribution, since reflected light from the retroreflecting members 4 is shielded by the pointer, the reflected light amount of only that part (light-shielded range) is low.

In this embodiment, the angles of the pointer with respect to the sensor units 1L and 1R are then calculated based on a change between the light amount distribution of FIG. 3A obtained when there is no input by the pointer, and that shown in FIG. 3B obtained when there is an input by the pointer.

More specifically, the light amount distribution of FIG. 3A is stored in advance in the memory 82 as an initial state. During a sampling period of the detection signals from the sensor units 1L and 1R, whether or not a change like the light amount distribution of FIG. 3B has occurred is detected based on the difference between the light amount distribution during that sampling period and that in the initial state (data obtained in the initial state will be referred to as initial data hereinafter). If such change in light amount distribution is detected, arithmetic operations for deciding input angles are made to have that change part as an input point of the pointer.

<Description of Angle Calculation>

Upon calculating the angles of the pointer with respect to the sensor units 1L and 1R, a light-shielded range by the pointer needs to be detected.

As described above, since the light amount distributions detected by the sensor units 1L and 1R are not constant due to factors such as aging and the like, it is desired to store the light amount distributions in the initial state in the memory 82 every time the system is started up.

That is, if initial data are set at the time of factory shipping or the like, and are not updated sequentially, when, for example, dust is attached to the retroreflecting surface at a predetermined position, the retroreflection efficiency of that part lowers. In this case, the apparatus detects the position as if a coordinate input operation were being made at that position (directions viewed from the sensor units), that is, it causes detection errors.

Therefore, by storing initial data at, for example, the startup timing of the system, even when the retroreflecting surface is temporally contaminated by, for example, dust, and the retroreflection efficiency lowers, that state is re-set as an initial state.

Of course, due to the influence of dust or the like on the light transmitting members 8 or retroreflecting members 4, if a light signal from the retroreflecting members 4 via the light transmitting members 8 cannot be received at all at that dust attached part, this results in a coordinate nondetectable situation. In this case, the dust or the like must be removed by an arbitrary method. On the other hand, when a light signal from the retroreflecting members 4 suffers a considerable drop, the signal reliability lowers in terms of the S/N ratio (a phenomenon of coordinate fluctuations occurs even though an identical point is pointed, thus lowering the coordinate calculation resolution). Therefore, even in such case, it is preferable to remove dust or the like attached to the light transmitting member 8 or retroreflecting member 4.

The angle calculations of the pointer for one of the sensor units 1L and 1R (for example, the sensor unit 1L) will be described below. However, the same angle calculations are made for the other (sensor unit 1R), needless to say.

Upon power ON, in a state without any input (without any light-shielded part), and a state in which light projection from the light projecting unit in the sensor unit 1L is stopped, the light amount distribution as an output of the detection unit is A/D-converted, and this value is stored in the memory 82 as Bas_data[N].

Note that this value is data including bias variations and the like of the detection unit (line CCD), and is data around level B in FIG. 3A. Note that N is the pixel number of each pixel which forms the line CCD, and the pixel number corresponding to an effective input range (effective range) is used.

Next, in a state in which light is projected from the light projecting unit, the light amount distribution as an output from the detection unit is A/D-converted, and this value is stored in the memory 82 as Ref_data[N].

Note that this value is data indicated by, for example, the solid line in FIG. 3A.

Then, using Bas_data[N] and Ref_data[N] stored in the memory 82, the presence/absence of an input by the pointer and that of a light-shielded range are determined.

Let Norm_data[N] be pixel data of the N-th pixel during the sampling period of the output from the sensor unit 1L (line CCD).

In order to specify the light-shielded range, the presence/absence of the light-shielded range is determined based on the absolute amount of a change in pixel data.

More specifically, the absolute amount of a change in pixel data is calculated for each pixel of the line CCD, and the calculated amount is compared with a predetermined threshold Vtha.

$$Norm\_data\_a[N]=Norm\_data[N]-Ref\_data[N] \quad (1)$$

where Norm_data_a[N] is the absolute change amount of each pixel of the line CCD.

This process can be simply attained by calculating the absolute change amount Norm_data_a[N] of each pixel of the line CCDs and comparing it with the threshold Vtha. In particular, if pixels that exceed the threshold Vtha for the first time are detected beyond a predetermined number, it is determined that an input by the pointer is detected.

In order to detect an input by the pointer with higher precision, a change ratio of pixel data is calculated using a method described using FIGS. 12 to 15 of U.S. Patent Application Publication No. 2006-12579 to decide an input point.

That is, assuming that the light amount shielded by the pointer is expressed by the change ratio of pixel data, it can be calculated by:

$$Norm\_data\_r[N]=Norm\_data\_a[N]/(Bas\_data[N]-Ref\_data[N]) \quad (2)$$

By applying a threshold Vthr to this pixel data, the pixel numbers corresponding to the leading part and trailing part of a pixel data distribution corresponding to the light-shielded range are acquired. Then, the center of these pixel numbers is defined as a pixel corresponding to the input by the pointer, thereby deciding the input position of the pointer more precisely.

Assume that the leading part of the pixel data distribution that intersects the threshold Vthr used to detect the light-shielded range by the pointer is the Nr-th pixel, and the trailing part is the Nf-th pixel. In this case, a central pixel Np between these pixels can be calculated by:

$$Np=Nr+(Nf-Nr)/2 \quad (3)$$

However, with this calculation, the pixel interval of the line CCD becomes the resolution of the output pixel numbers.

Hence, in order to attain detection at higher resolution, a virtual pixel number that intersects the threshold Vthr is calculated using the data level of each pixel, and that of an immediately preceding neighboring pixel.

Let Lr be the data level of the Nr-th pixel, and Lr−1 be that of the (Nr−1)-th pixel. Also, let Lf be the data level of the Nf-th pixel, and Lf−1 be that of the (Nf−1)-th pixel. In this case, respective virtual pixel numbers Nrv and Nfv can be calculated by:

$$Nrv=Nr-1+(Vthr-Lr-1)/(Lr-Lr-1) \quad (4)$$

$$Nfv=Nf-1+(Vthr-Lf-1)/(Lf-Lf-1) \quad (5)$$

Then, a virtual central pixel Npv between these virtual pixel numbers Nrv and Nfv is decided by:

$$Npv=Nrv+(Nfv-Nrv)/2 \quad (6)$$

In this way, since the virtual pixel number that intersects the threshold Vthr is calculated based on the pixel number of a pixel with the data level that exceeds the threshold Vthr, its neighboring pixel number, and their data levels, detection with higher resolution can be realized.

<Conversion from Pixel Number to Angle Information>

In order to calculate an actual coordinate value of the pointer from the central pixel number indicating the central point of the light-shielded range, this central pixel number needs to be converted into angle information (θ).

The relationship between the pixel number and θ will be described below with reference to FIG. 4.

Figure 4:
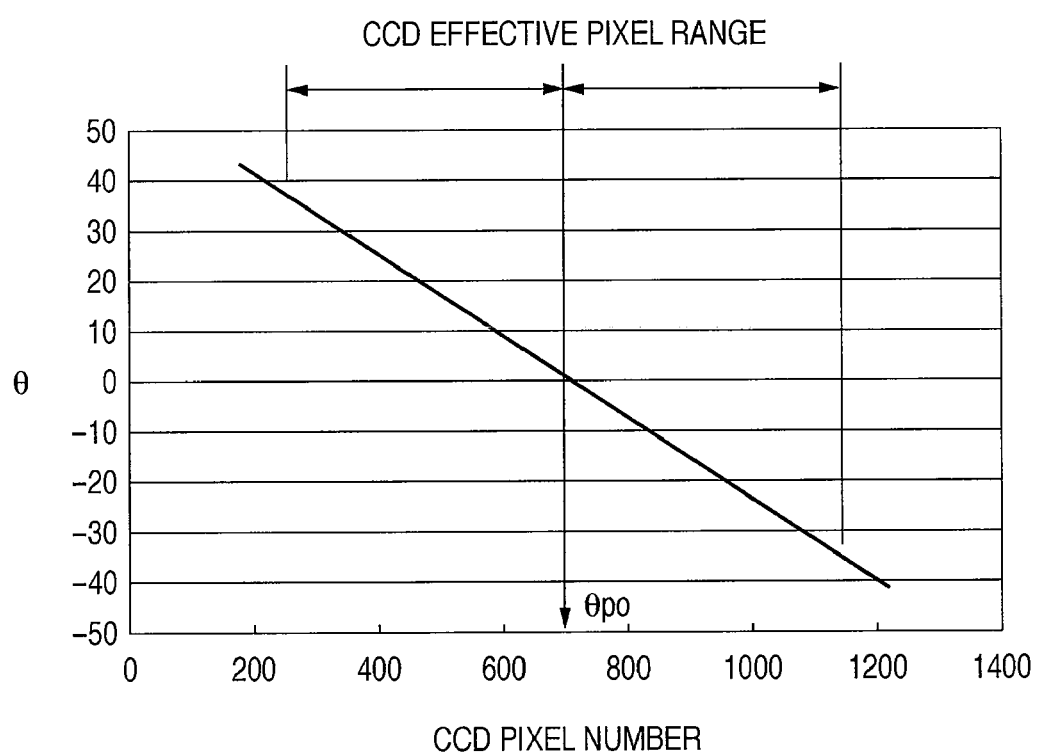
FIG. 4 is a graph showing the relationship between the pixel numbers and θ values according to the embodiment of the present invention.

FIG. 4 is a graph showing the relationship between the pixel numbers and θ values according to the embodiment of the present invention.

Based on FIG. 4, an approximation formula required to calculate θ from the pixel number is defined by:

$$\theta=f(N) \quad (7)$$

Using this approximation formula (conversion formula), the pixel number can be converted into θ.

In this embodiment, a lens group of the detection unit in the aforementioned sensor unit 1L (1R) is configured to allow approximation using a linear approximation formula. However, angle information with higher precision can often be obtained using an approximation formula of higher order due to optical aberrations of lenses and the like.

Note that a lens group to be adopted is closely related to the manufacturing cost. Particularly, when optical distortion normally generated by lowering the manufacturing cost of a lens group is corrected using an approximation formula of higher order, higher arithmetic power (arithmetic speed) is required accordingly. Therefore, in consideration of the coordinate calculation precision required for a target product, the lens group and approximation formula may be appropriately set.

<Description of Coordinate Calculation Method>

A coordinate calculation method for calculating the coordinate position of the pointer based on angle data (tan θ) converted from the pixel number will be described below.

The coordinates defined on the coordinate input effective region 3 and the positional relationship between the sensor units 1L and 1R will be described below with reference to FIG. 5.

Figure 5:
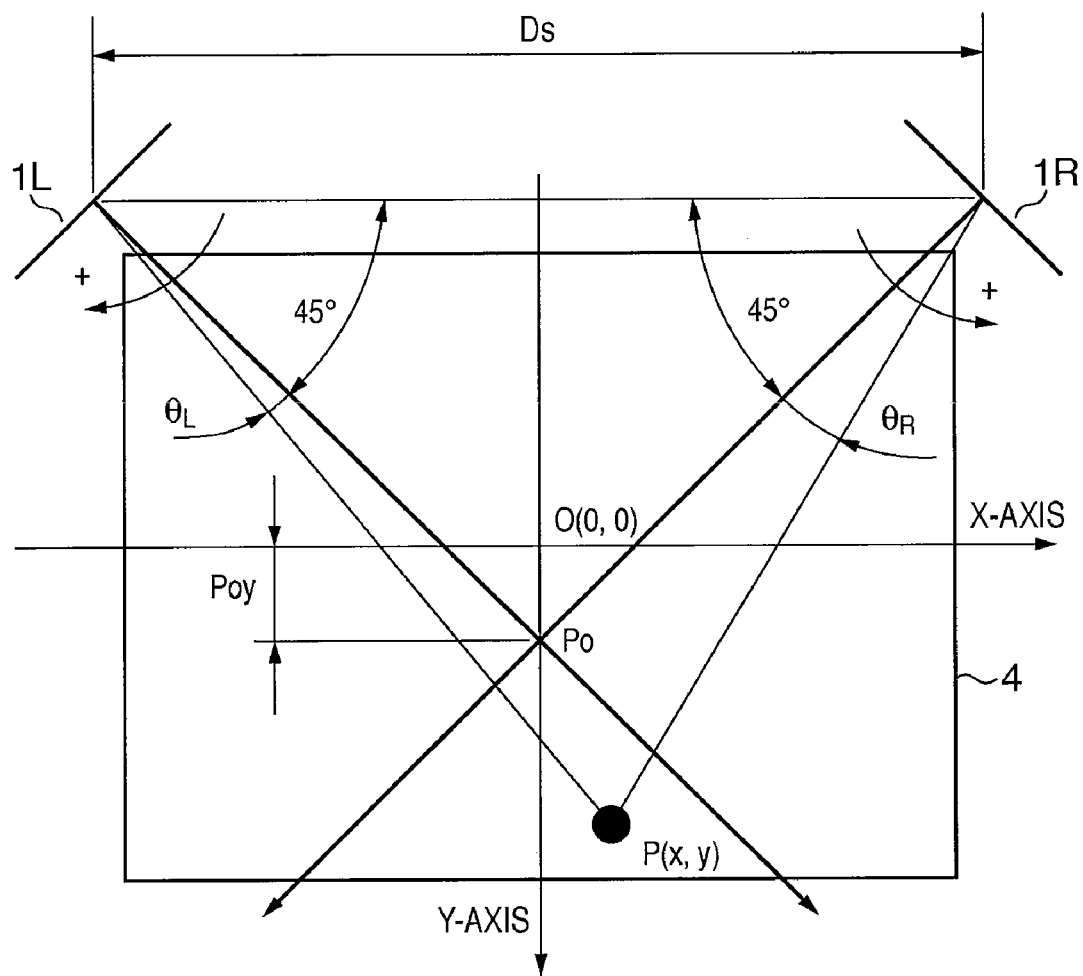
FIG. 5 is a view showing the coordinates defined on a coordinate input effective region and the positional relationship between sensor units 1L and 1R according to the embodiment of the present invention.

FIG. 5 is a view showing the coordinates defined on the coordinate input effective region and the positional relationship between the sensor units 1L and 1R according to the embodiment of the present invention.

FIG. 5 defines an X-axis in the horizontal direction of the coordinate input effective region 3 and a Y-axis in the vertical direction, and defines the center of the coordinate input effective region 3 as an origin position O (0, 0). The sensor units 1L and 1R are attached to the left and right positions of the top side of a coordinate input range of the coordinate input effective region 3 to be symmetrical about the Y-axis, and to have a distance Ds between them.

The light receiving surface of each of the sensor units 1L and 1R is arranged so that its normal direction makes an angle of 45° with the X-axis, and that normal direction (reference direction) is defined as 0°.

At this time, as for the sign of an angle, in case of the sensor unit 1L arranged on the left side, the clockwise direction is defined as "+" direction. In case of the sensor unit 1R arranged on the right side, the counterclockwise direction is defined as a "+" direction.

Furthermore, Po represents an intersection position between the normal directions of the sensor units 1L and 1R. Also, a distance from the origin in the Y-axis direction is defined as Poy. At this time, letting θL and θR be the angles obtained by the sensor units 1L and 1R, coordinates P(x, y) of a point P to be detected are calculated by:

$$x = Ds/2 * (\tan \theta R - \tan \theta L)/(1 - (\tan \theta R * \tan \theta L)) \quad (8)$$

$$y = Ds/2 * (\tan \theta R + \tan \theta L + (2 * \tan \theta R * \tan \theta L))/(1 - (\tan \theta R * \tan \theta L)) + Poy \quad (9)$$

The coordinate calculation processing of the coordinate input apparatus based on the aforementioned arrangement will be described below with reference to FIG. 6.

Figure 6:
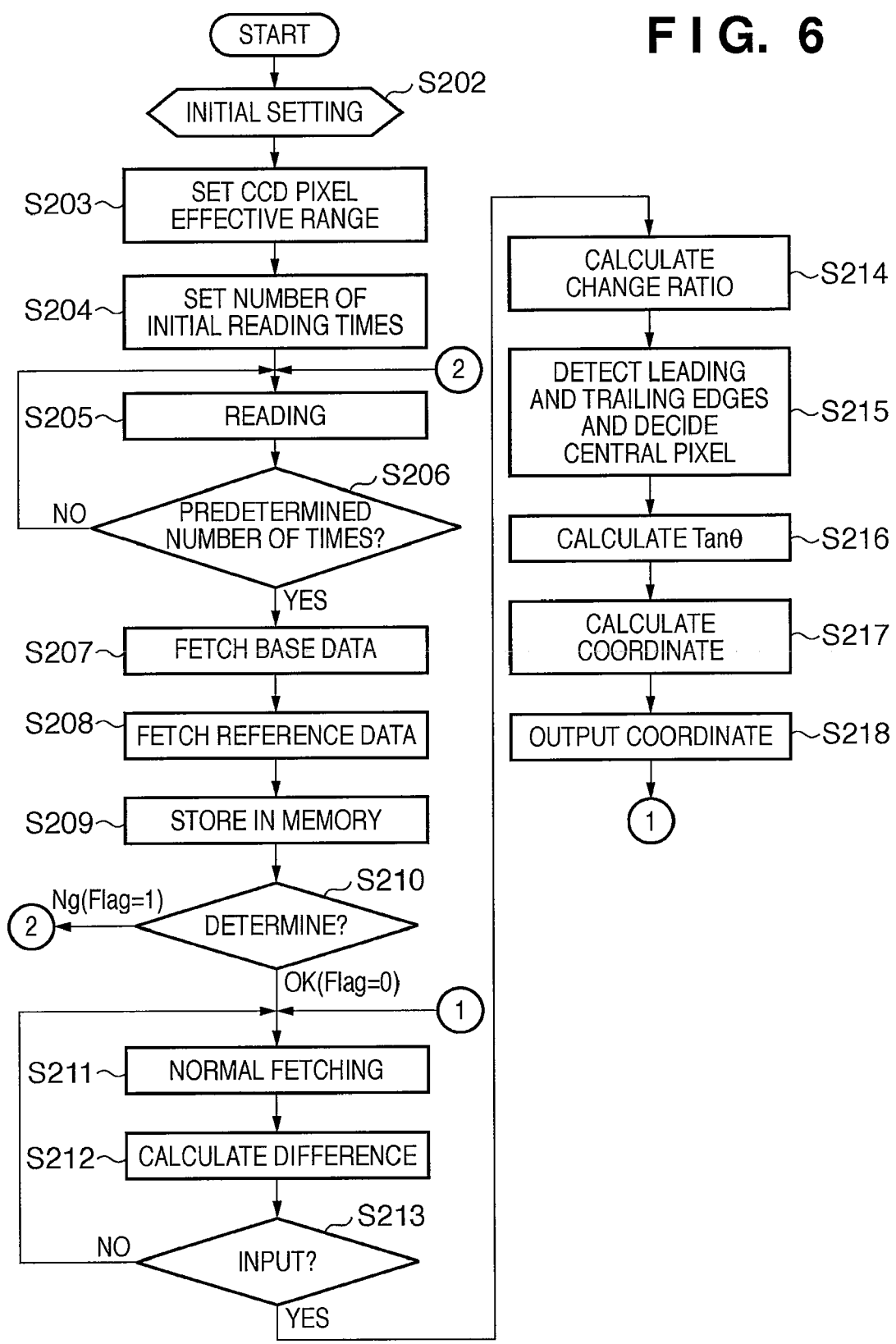
FIG. 6 is a flowchart showing coordinate calculation processing executed by the coordinate input apparatus according to the embodiment of the present invention.

FIG. 6 is a flowchart showing the coordinate calculation processing executed by the coordinate input apparatus according to the embodiment of the present invention.

After power-ON of the coordinate input apparatus, various initialization processes associated with the coordinate input apparatus such as port settings, timer settings, and the like of the control and arithmetic unit 2 are executed in step S202.

In step S203, the CCD pixel effective ranges of the line CCDs in the detection units arranged in the sensor units 1L and 1R are set based on, for example, setting values stored in advance in the memory 82.

In step S204, the number of initial reading times of an initial reading operation of each line CCD is set.

Note that this initial reading operation is required to remove unwanted charges of the line CCDs upon starting up the coordinate input apparatus.

In step S205, unwanted charges in the line CCDs are removed by executing the reading operation while light projection by the light projecting units arranged in the sensor units 1L and 1R is stopped. It is determined in step S206 if the reading operation has been executed the predetermined number of times or more. If the reading operation has not been executed the predetermined number of times or more yet (NO in step S206), the process returns to step S205. On the other hand, if the reading operation has been executed the predetermined number of times or more (YES in step S206), the process advances to step S207.

In step S207, pixel data (Bas_data[N]) of the line CCDs while light projection of the light projecting units is stopped are sampled as base data. In step S208, pixel data (Ref_data[N]) of the line CCDs while light is projected from the light projecting units are sampled as reference data. In step S209, the base data and reference data are stored in the memory 82.

In step S210, the validity of the base data (Bas_data[N]) and reference data (Ref_data[N]) is determined. Note that details of the validity determination will be described later. As a result of determination, if these data are effective, that is, they are normal (OK), the process advances to step S211 and subsequent steps to execute normal coordinate calculations. In this case, Flag=0 is set as a flag that advises accordingly.

On the other hand, if the base data and reference data are not effective, that is, they include an abnormality (NG), the process returns to step S205 after execution of predetermined processing, and the base data and reference data are sampled again. In this case, Flag=1 is set as a flag that advises accordingly.

The processes executed so far are the initial setting operations upon power ON. The initial setting operations may be executed according to the intention of the operator by a reset switch or the like provided to the coordinate input apparatus. The control advances to a normal coordinate input operation state using the pointer 5 via the initial setting operations.

In step S211, a normal sampling operation of the line CCDs is executed in a coordinate input sampling state to sample pixel data (Norm_data[N]).

In step S212, difference values between the reference data (Ref_data[N]) and pixel data (Norm_data[N]) are calculated. In step S213, the presence/absence of an input (light-shielded part) by the pointer 5 is determined based on the difference values and the aforementioned threshold Vthr. If no input is detected (NO in steps S213), the process returns to step S211. On the other hand, if an input is detected (YES in step S213), the process advances to step S214 to calculate the change ratios of pixel data using equation (2).

In step S215, the trailing and leading edges of a pixel data distribution corresponding to the light-shielded range by the pointer 5 are detected based on the calculated change ratios of pixel data. Using the detected trailing and leading edges and equations (4), (6), and (7), a virtual central pixel number as the center of the light-shielded range is decided.

In step S216, Tan θ is calculated based on the determined central pixel number and approximation polynomial. In step S217, input coordinates P(x, y) of the pointer 5 are calculated using equations (8) and (9) based on the tan θ values for the sensor units 1L and 1R.

In step S218, the calculated coordinate value is output to the external terminal. This output may be sent via serial communications such as a USB interface, RS232C interface, or the like or may be sent via wireless communications such as a wireless LAN, Bluetooth, or the like.

In the external terminal, a device driver that controls the coordinate input apparatus implements the manipulation of a display screen by interpreting the received data, and by moving a cursor and changing a mouse button status.

Upon completion of the processing in step S218, the process returns to step S211 to repeat the aforementioned processes until power OFF or until a reset state is set by the intention of the operator.

When this repetition period is set to be about 10 msec, the coordinate input apparatus can output coordinates pointed by a finger or the pointer 5 to the external apparatus or the like in periods of 100 times/sec.

<Description of Validity Determination>

In order to determine the validity of the base data (Bas_data [N]) and reference data (Ref_data[N]), data need to be acquired in an environment in which environmental light around the apparatus is perfectly shielded, that is, in a dark environment such as a dark room or the like upon manufacture in a factory.

The processing for implementing this determination is the same as steps S202 to S209 in FIG. 6, and will be described with reference to FIG. 6.

In steps S202 to S206, by executing the reading operation the predetermined number of times while light projection of the light projecting units arranged in the sensor units 1L and 1R is stopped, unwanted charges in the line CCDs are removed.

Figure 7A:
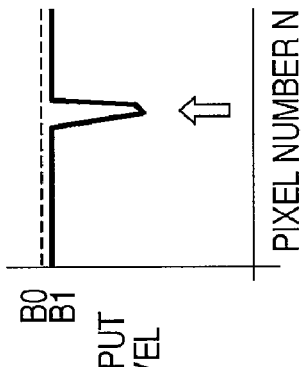
FIGS. 7A to 7F are graphs for explaining initial data and abnormal signals according to the embodiment of the present invention.

In step S207, pixel data (Bas_data0[N]) of the line CCDs while light projection of the light projecting units is stopped are sampled as base data. In this case, since an output is measured without any surrounding environmental light, a signal to be detected has output characteristics while no light becomes incident on each line CCD and, for example, a signal B0 having a signal level shown in FIG. 7A is obtained. The signal B0 assumes different values depending on the individual differences of the line CCD as a photoelectric conversion element. However, the signal level assumes nearly uniform values over respective pixels.

In step S208, pixel data (Ref_data0[N]) of the line CCDs while light is projected from the light projecting units are sampled as reference data. In this process, reference data corresponding to a light amount distribution when light is projected from the light projecting units without any surrounding environmental light are sampled and, for example, a signal falling within the range from an output level R0 to an output level A0 is obtained, as shown in FIG. 7B.

The reason why the output level does not become constant and varies within the range from the output level R0 to output level A0 within an effective pixel range to be detected includes various factors. For example, as one factor, the positions of the retroreflecting members 4 and the distance between the sensor units 1L and 1R, which are to be arranged, vary depending on the shape and size of the coordinate input effective region 3 in accordance with angles viewed from the sensor units 1L and 1R. Another factor includes the retroreflection efficiency of the retroreflecting members 4 depending on the incident angles of light which becomes incident on the retroreflecting members 4, or the light projecting distribution of the light projecting units and the focusing characteristics of the detection units (light receiving units).

Figure 7C:
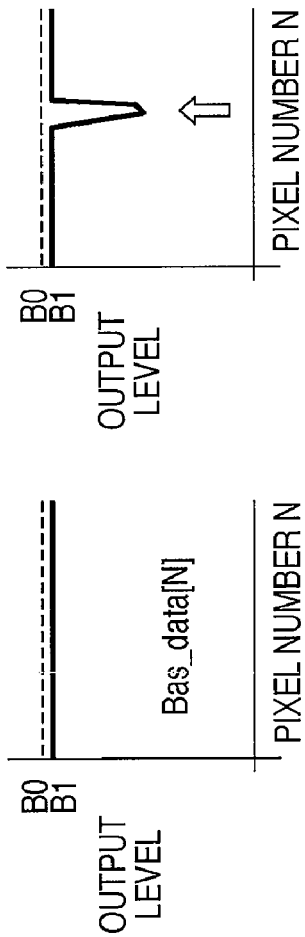
Figure 7E:
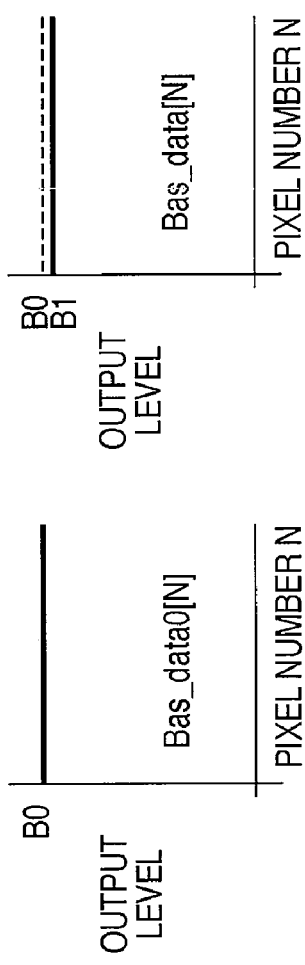
Figure 7B:
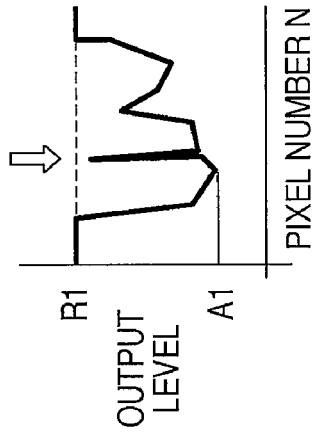

Therefore, as shown in FIG. 7B, the effective pixel range includes a part where the signal level becomes weakest, and a part where the signal level becomes largest. Then, for example, currents to be supplied to elements as light emitting sources of the light projecting units are increased within a range in which a signal is not saturated in the part where the signal level becomes largest, so as to make signal detection stable in the part where the signal level becomes weakest, thereby obtaining satisfactory detection signals.

In step S209, the acquired base data (Bas_data0[N]) and reference data (Ref_data0[N]) are stored in the memory 82, thus semipermanently holding the base data and reference data. Note that these base data and reference data may be stored in a nonvolatile memory different from the memory 82.

With the aforementioned processing, the base data (first base data) and reference data (first reference data) upon factory shipping can be acquired and stored in the memory.

Note that the dark environment is described as an environment in which there is no light around the apparatus. However, the present invention is not limited to this. For example, a light environment around the apparatus, in which light is isotropically incident on the apparatus, may be used (to avoid an environment in which a light source such as a spotlight is locally incident). That is, if light is isotropically incident, the value of the signal level B0 of the base data is output as the sum of the energy of that light and the individual difference of the line CCD. In this case, data acquired in a state without any ambient light and those acquired in a state with isotropic ambient light have an offset relationship, and the coordinates can be calculated in consideration of this offset amount.

A case will be examined below wherein a coordinate input apparatus which holds data measured in the dark environment is actually used in the market. Assume that ambient light in an installation environment is uniform (e.g., an environment under a fluorescent lamp, in which no light source exists near the apparatus, is assumed).

In this case, the line CCDs (photoelectric conversion elements) are influenced by ambient light although slightly. For this reason, second base data (Bas_data[N] (=B1(N))) detected in step S207 upon execution of the coordinate calculation processing is observed as a signal translated (offset) from the first base data (Bas_data0[N] (=B0(N))) upon factory shipping. Then, the output level becomes a signal B1, as shown in, for example, FIG. 7C.

Figure 7D:
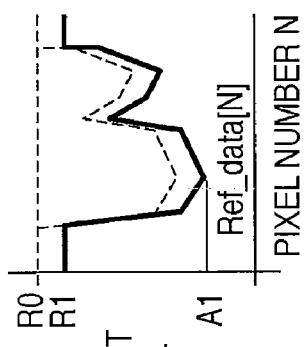

On the other hand, second reference data (Ref_data[N] (=R1(N))) detected in step S208 upon execution of the coordinate calculation processing is influenced by the ambient light as in the case of the base data. For this reason, the second reference data (Ref_data[N] (=R1(N))) has a translated (offset) relationship with the first reference data (Ref_data0[N] (=R0(N))) upon factory shipping. Then, the output level becomes a signal R1, as shown in, for example, FIG. 7D.

However, assume that the base data (Bas_data[N]) detected in the state without any light projection by the light projecting units include abnormal light, as indicated by an arrow in FIG. 7E. Note that the sensor units 1L and 1R are arranged at the corners of the coordinate input effective region 3, as shown in FIG. 1. If the detection signals of both the sensor units 1L and 1R include abnormal light shown in FIG. 7E, it can be determined that the abnormal light was emitted by a light emitting source (other than the light projecting units) of that abnormal light, which exists inside the coordinate input effective region 3.

More specifically, it is assumed that the operator operated the pointer having the light emitting unit inside the coordinate input effective region 3 to emit light and that light was detected upon data acquisition at the time of power ON. In such case, the acquired initial data values include errors, and seriously affect the subsequent coordinate calculations. Therefore, the operator is informed of such abnormal state, so as to acquire normal initial data.

The sensor units 1L and 1R detect different positions of abnormal light (pixel numbers of the CCDs=angle information) depending on the light emitting source position of abnormal light. For this reason, an approximate position of the light emitting source can be specified based on the angle information obtained by the sensor units 1L and 1R, and the operator can easily avoid any trouble since he or she is informed of that position.

On the other hand, when either one of the sensor units 1L and 1R detects abnormal light shown in FIG. 7E, it can be determined that the abnormal light comes from a region outside the coordinate input effective region.

That is, the fact that one sensor unit detects abnormal light but the other sensor unit does not detect any abnormal light means that a light source exists within the measurement field of the former but no light source exists within the measurement field of the latter. Therefore, whether the abnormal light is generated from a position inside or outside the coordinate input effective region 3 (a position either inside or outside the coordinate input effective region) can be determined. Furthermore, the operator can be informed of the light source direction of that abnormal light based on angle information of the abnormal light detected by the sensor unit which detected the abnormal light.

At this time, as a light source of abnormal light, an incandescent lamp, spotlight, sunlight, or the like is assumed. Hence, by instructing and prompting the operator to turn off or shield a light source that exists in the informed direction, the operator can easily avoid any trouble.

Figure 7F:
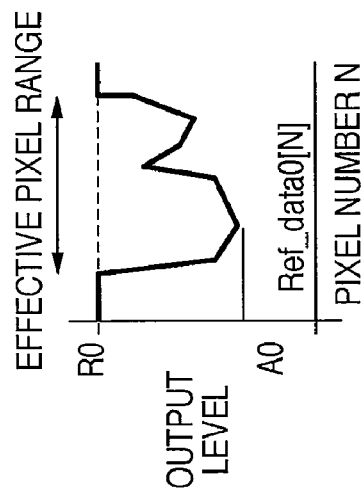

Next, assume that the reference data (Ref_data[N]) in the state with light projected by the light projecting units indicate a state in which light cannot be detected, as indicated by an arrow in FIG. 7F. This state indicates the existence of an object (light-shielding object) that shields light in a direction, in which an abnormality has occurred, when viewed from each sensor unit 1.

In this case, an approximate angle can be calculated based on the pixel number where the abnormality has occurred. If both the sensor units detect the abnormality, an approximate position of the light-shielding object that shields light can be calculated. In such case, by informing the existence of the light-shielding object at that position, the operator can easily avoid any trouble.

On the other hand, assume that either one sensor unit detects this abnormality. In this case, the existence position of the light-shielding object is limited to a position which falls outside the coordinate input effective region 3 and is near the light transmitting member 8, which opposes the sensor unit that detected the abnormality and is parallel to the Y-axis. This is because if the light-shielding object exists at a position near the light transmitting member 8 which opposes the sensor unit that detected the abnormality and is parallel to the X-axis, that position falls within the measurement fields of both the sensor units 1. Also, this is because if one sensor unit can detect an abnormality, the other sensor unit should also be able to detect the abnormality, and its approximate position should be able to be calculated.

Therefore, when only one sensor unit detects a light-shielded shadow, an approximate position of the light-shielding object can be detected based on a direction derived by that sensor unit and a condition that the position is near the light transmitting member 8 falling outside the coordinate input effective region 3, and the operator can be informed of that information.

Details of the validity determination processing (step S210 in FIG. 6) including abnormality informing processing required to inform the aforementioned abnormal state will be described below with reference to FIG. 8.

Figure 8:
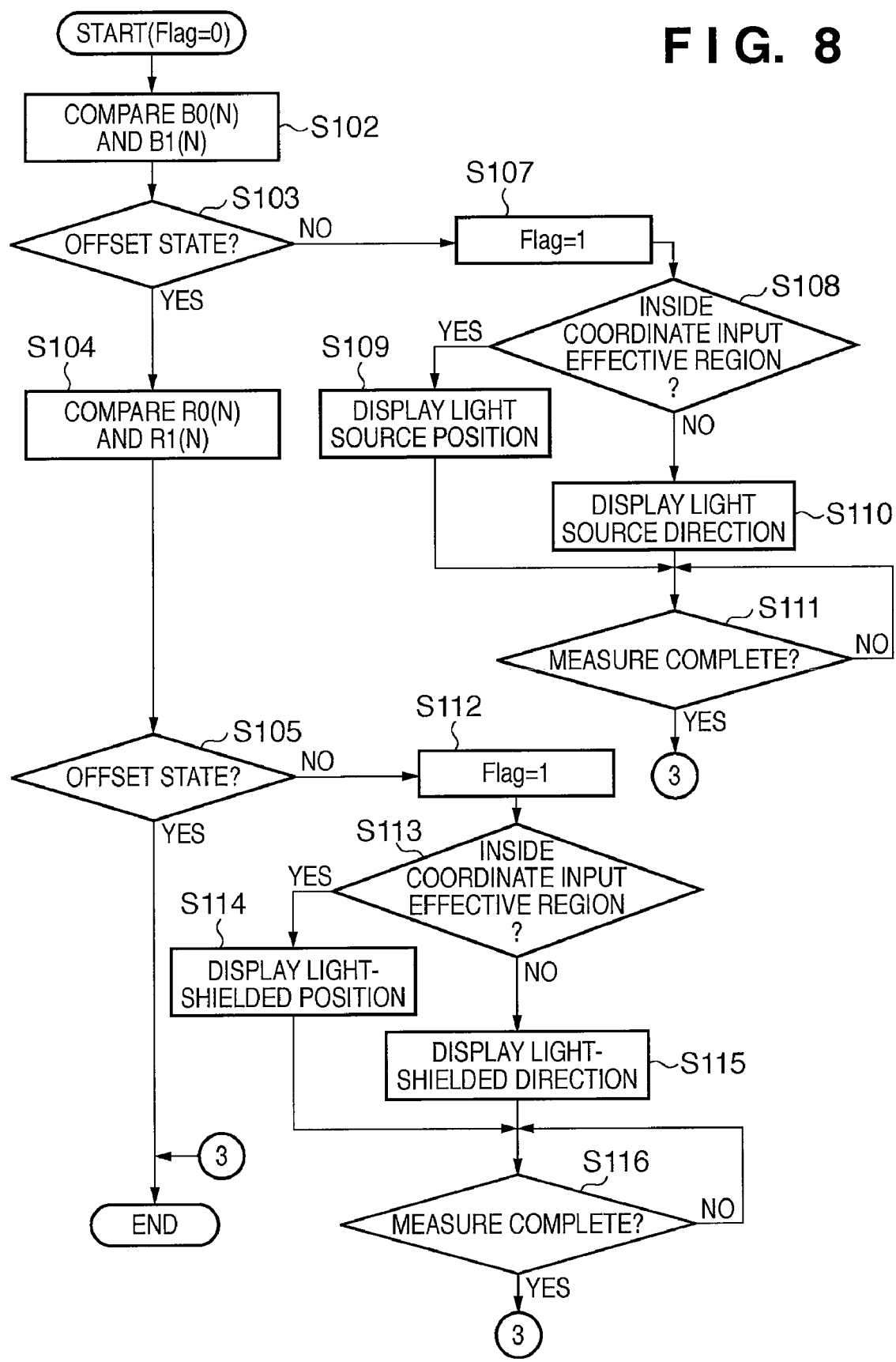
FIG. 8 is a flowchart showing details of validity determination processing according to the embodiment of the present invention.

FIG. 8 is a flowchart showing details of the validity determination processing according to the embodiment of the present invention.

Upon execution of this processing, assume that initial data B0(N) and R0(N) upon factory shipping or the like are stored in a first storage area of the memory 82. Also, assume that acquisition of initial data B1(N) and R1(N) upon power ON in the installation environment is completed according to steps S202 to S209 of the flowchart in FIG. 6, and these data are stored in a second storage area of the memory 82.

In step S102, the initial data B0(N) upon factory shipping are compared with the initial data B1(N) upon power ON (or upon resetting the system). It is determined in step S103 based on the comparison result if these data are in an offset state, as described using FIG. 7C. If these data are in an offset state (YES in step S103), it is determined that the initial data B1(N) upon power ON are normal, and "0" indicating that the data are normal is set in "Flag" indicating the state of the initial data B1(N) upon power ON (Flag=0). The process then advances to step S104. On the other hand, if these data are not in an offset state (NO in step S103), it is determined that the initial data B1(N) upon power ON are abnormal (abnormal light exists), and the process advances to step S107.

In step S107, "1" indicating that the data are abnormal is set in "Flag" indicating the state of the initial data B1(N) upon power ON (Flag=1). Whether or not abnormal light exists inside the coordinate input effective region is determined in step S108 by comparing the detection signals of both the sensor units 1L and 1R. If abnormal light exists inside the coordinate input effective region (YES in step S108), the process advances to step S109.

Figure 9A:
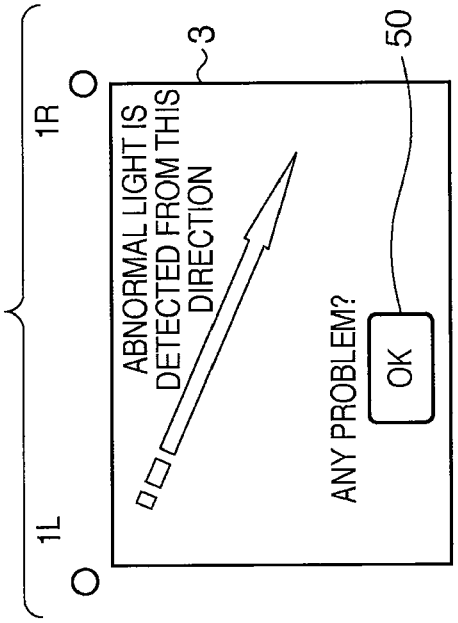
FIGS. 9A to 9D show examples of information dialogs used to inform an abnormal state according to the embodiment of the present invention.
Figure 9B:
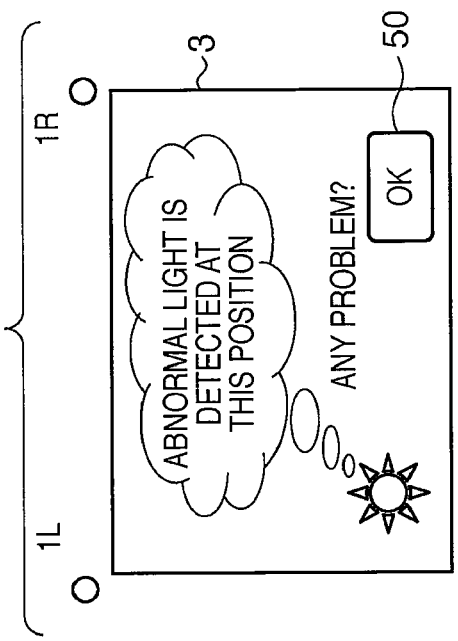
Figure 9C:
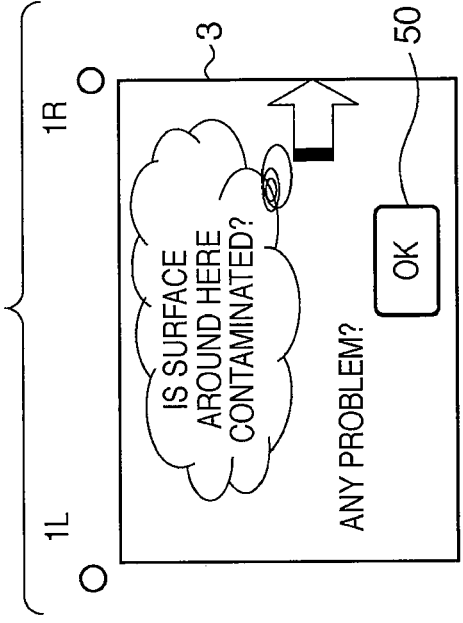
Figure 9D:
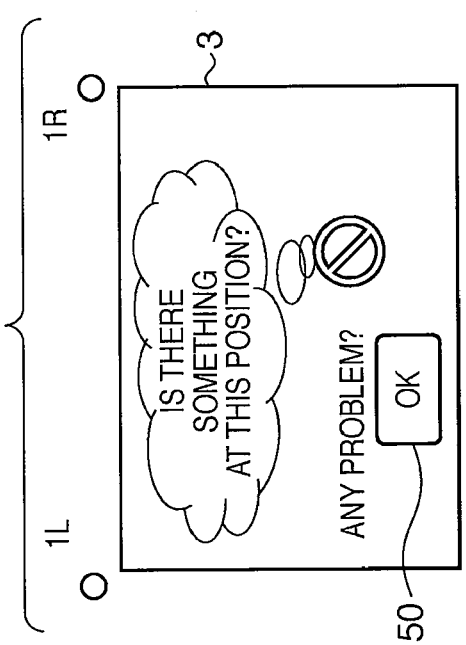

In step S109, a display window used to inform the position of that abnormal light (light source position) is displayed on a display device (e.g., FIG. 9A). This display device includes, for example, the display device 10 arranged to be overlaid on the coordinate input apparatus, or a display device of a personal computer connected to the coordinate input apparatus.

On the other hand, if abnormal light exists outside the coordinate input effective region (NO in step S108), the process advances to step S110. In step S110, a display window indicating the direction of that abnormal light (light source direction) is displayed on the display device (e.g., FIG. 9B).

It is determined in step S111 if a measure taken based on the displayed display window is complete. If the measure is complete (YES in step S111), "0" indicating that the data are normal is set in "Flag" indicating the state of the initial data B1(N) upon power ON (Flag=0), thus ending the processing. On the other hand, if the measure is not complete yet (NO in step S111), the control waits until it is complete.

As the measure in this case, the operator removes a cause of that abnormal light based on the display contents of the display window. When the operator presses an OK button 50 on the display window after completion of the measure, it is determined that the measure is complete.

On the other hand, if the initial data are in an offset state (YES in step S103), the initial data R0(N) upon factory shipping are compared with the initial data R1(N) upon power ON in step S104. It is determined in step S105 based on the comparison result if these data are in an offset state, as described using FIG. 7D. If these data are in an offset state (YES in step S105), it is determined that the initial data R1(N) upon power ON are normal, and "0" indicating that the data are normal is set in "Flag" indicating the state of the initial data R1(N) upon power ON (Flag=0), thus ending the processing. On the other hand, if these data are not in an offset state (NO in step S105), it is determined that the initial data R1(N) upon power ON are abnormal (a light-shielding object exists), and the process advances to step S112.

In step S112, "1" indicating that the data are abnormal is set in "Flag" indicating the state of the initial data R1(N) upon power ON (Flag=1). Whether or not abnormal light exists inside the coordinate input effective region is determined in step S113 by comparing the detection signals of both the sensor units 1L and 1R.

As the determination method in this case, when the output from either one of the sensor units 1L and 1R includes an abnormality, it is determined that a light-shielding object exists outside the coordinate input effective region. On the other hand, when the outputs from both the sensor units include an abnormality, position information is calculated from these outputs, and whether a light-shielding object exists inside or outside the coordinate input effective region is determined based on the positional relationship between the calculated position information and the coordinate input effective region.

If a light-shielding object exists inside the coordinate input effective region (YES in step S113), the process advances to step S114. In step S114, a display window used to inform the position of that light-shielding object (light-shielded position) is displayed on the display device (e.g., FIG. 9C).

On the other hand, if a light-shielding object exists outside the coordinate input effective region (NO in step S113), the process advances to step S115. In step S115, a display window indicating the direction of that light-shielding object (light-shielded direction) is displayed on the display device (e.g., FIG. 9D). When the light-shielding object exists outside the coordinate input effective region, a case is assumed wherein dust is attached or deposited on, for example, the surface of the light transmitting member 4 used to protect the retroreflecting member 4.

It is determined in step S116 if a measure taken based on the displayed display window is complete. If the measure is complete (YES in step S116), "0" indicating that the data are normal is set in "Flag" indicating the state of the initial data R1(N) upon power ON (Flag=0), thus ending the processing. On the other hand, if the measure is not complete yet (NO in step S116), the control waits until it is complete.

As the measure in this case, the operator removes a cause of that light-shielding object based on the display contents of the display window. When the operator presses the OK button 50 on the display window after completion of the measure, it is determined that the measure is complete.

With the aforementioned processing, Flag=0 or Flag=1 is obtained for the initial data B1(N) and R1(N) upon power ON in step S210 in FIG. 6. In this way, the presence/absence of abnormality of the initial data B1(N) and R1(N) upon power ON can be determined. If Flag=1, the cause of abnormality is removed, and the process then returns to step S205 to acquire initial data B1(N) and R1(N) again.

Therefore, in a state in which an abnormality is detected, that state is determined to inform the operator of that cause and to prompt him or her to remedy. After that, the determination processing is executed again. After it is confirmed that no abnormality is detected, the control advances to the processes in steps S211 to S218. Therefore, a coordinate position with high precision and high reliability can be calculated.

When the level of abnormal light in the signal B1(N) shown in FIG. 7E is small, and the signal R1(N) based on light projected by the light projecting units is not saturated, a coordinate position with high precision can be calculated as long as the following condition is satisfied.

That is, when the abnormal light comes from an incandescent lamp or spotlight, the state of that light source need only remain unchanged during use. However, if such light source is turned off during use, the coordinate input apparatus malfunctions. Therefore, the coordinate input apparatus is configured to allow the operator to set the installation environment in advance so as not to cause such state, thus providing an environment with high reliability.

On the other hand, when the abnormal light is sunlight, since the position of the sun changes along with an elapse of time, this also causes a malfunction. Therefore, at the beginning of manipulation, it is desirable to preclude such environment beforehand.

In this manner, the operator can easily preclude causes of malfunctions upon making coordinate input operations.

As another embodiment, a case will be examined wherein a light source that causes a trouble is turned on during use.

The coordinate input apparatus that adopts the light-shielding method according to the present invention is configured to calculate a light-shielded position by shielding light. In this case, data obtained by the normal sampling operation in step S211 upon coordinate sampling in the processes of steps S211 to S218 in FIG. 6 are focused.

Figure 10C:
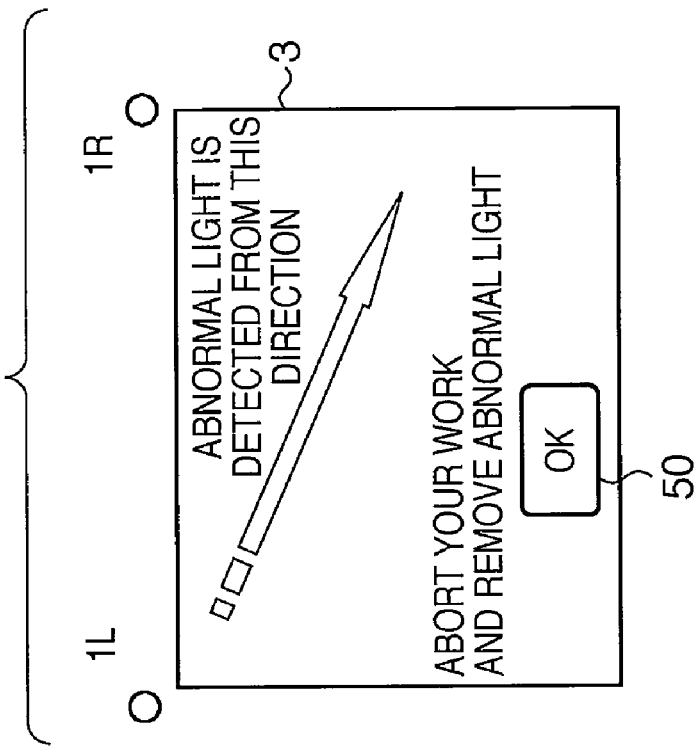
FIGS. 10A to 10C are views showing the detection method of an abnormal state and an information dialog used to inform the abnormal state according to the embodiment of the present invention.
Figure 10A:
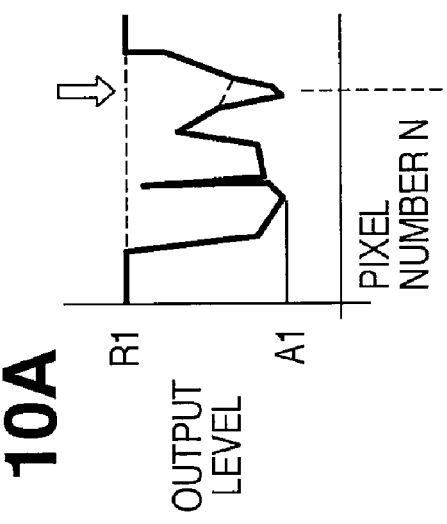
Figure 10B:
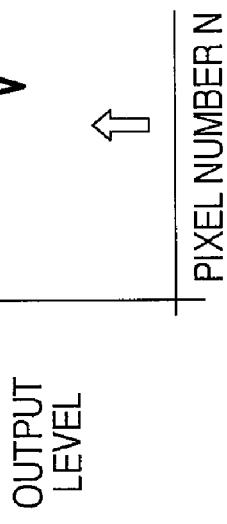

When a spotlight that causes a trouble is turned on during use, a signal shown in FIG. 10A is obtained, and the light amount of a part where spotlight light is incident (indicated by an arrow in FIG. 10A) increases. Therefore, by comparing this data with the initial data R1, the part where the light amount increases can be detected. If base data without light projection by the light projecting units are acquired in this state, a signal shown in FIG. 10B is to be obtained (a signal equivalent to FIG. 7E).

Therefore, when the signal level of a signal obtained upon normal coordinate sampling locally increases compared to the initial data R1(N) upon power ON, that state can be detected. By displaying a display window shown in FIG. 10C on the display device, an abnormality is informed so as to prompt the operator to abort the work and to turn off the spotlight as a cause of the abnormality.

Since the aforementioned coordinate input apparatus is arranged to be overlaid on the display device, when the operator inputs coordinates, the apparatus can display the locus of the input coordinates on the display device. In this way, an environment as if characters and figures were being drawn on a whiteboard using a marker can be provided to the operator. That is, a personal computer, which executes display control of the display device, may receive coordinates which are detected and output by the coordinate input apparatus, and may display a point at that coordinate position.

As described above, according to this embodiment, the light amount distributions obtained in states with and without light projection of the light projecting units are compared with those obtained in the states with and without light projection of the light projecting units when the apparatus is actually installed and is turned on (or when the apparatus is reset). Based on this comparison result, an abnormal state such as the presence/absence of abnormal light due to the installation environment or its direction or position, or the presence/absence of an obstacle (light-shielding object) or its position or the like can be detected.

In this way, by outputting the abnormal state to, for example, a personal computer, the personal computer can inform the operator of the abnormality using the display window in a display format that the operator can easily understand (e.g., see FIGS. 9A to 9D). With this display, the personal computer can prompt the operator to remove that abnormal state.

The informing method is not limited to this. If disturbance unwanted light or an obstacle is detected, the coordinate input apparatus may comprise an indicator such as a light emitting LED or the like which indicates that state.

As described above, according to this embodiment, by informing the presence/absence of abnormal disturbance light or its light source position, or the presence/absence of an abnormal light-shielding object or its position, the operator can be informed of a cause of malfunctions. As a result, the operator can easily remedy that installation environment or remove an obstacle. Therefore, the operator can perform a highly reliable coordinate input operation in a stable operation environment during use.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-191219 filed on Jul. 23, 2007, which is hereby incorporated by reference herein in its entirety.

What is claimed is:

1. A coordinate detection apparatus for detecting coordinates of a light-shielded position, comprising:
   input means for inputting output from light receiving means; and
   detection means for detecting an obstacle, which exists in a first state, based on a first output from said light receiving means in the first state in which light projecting means projects light, for detecting abnormal light based on a second output from said light receiving means in a state in which said light projecting means does not project any light, and for detecting coordinates of a light-shielded position based on a third output from said light receiving means in a second state in which said light projecting means projects light.

2. The apparatus according to claim 1, wherein said detection means detects a direction, in which the abnormal light is projected, based on the second output from said light receiving means in the state in which said light projecting means does not project any light.

3. The apparatus according to claim 1, wherein said detection means detects a position of a light source of abnormal light, which exists inside a coordinate input region, based on the second output from said light receiving means in the state in which said light projecting means does not project any light.

4. The apparatus according to claim 1, wherein said detection means comprises warning means for warning detection of the obstacle or abnormal light.

5. The apparatus according to claim 1, wherein said detection means comprises storage means for storing a first output value of said light receiving means in the first state in which said light projecting means projects light, and
   said detection means detects coordinates of a light-shielded position based on the third output of said light receiving means in the second state in which said light projecting means projects light, and on the first output value stored in said storage means.

6. The apparatus according to claim 1, wherein said detection means comprises storage means for storing a fourth output value of said light receiving means in a third state in which said light projecting means projects light, and for storing a fifth output value of said light receiving means in a fourth state in which said light projecting means does not project any light, and
   said detection means detects the obstacle based on the first output from said light receiving means in the first state in which said light projecting means projects light, and on the fourth output value stored in said storage means, and detects the abnormal light based on the second output from said light receiving means in a state in which said light projecting means does not project any light, and on the fifth output value stored in said storage means.

7. The apparatus according to claim 6, wherein said detection means stores the fourth and fifth output values upon manufacture of the apparatus in a factory.

8. The apparatus according to claim 1, wherein said detection means comprises output means for outputting a position of the obstacle or a direction from which the abnormal light is projected.

9. The apparatus according to claim 1, wherein said detection means detects the obstacle and the abnormal light when the apparatus is powered on or the apparatus is reset.

10. The apparatus according to claim 1, further comprising retroreflecting means for retroreflecting light, which is arranged on surrounding portions of a coordinate input effect region, and
   detection means having a light projecting unit and a light receiving unit, which are arranged at least two corner positions of the coordinate input effect region,
   wherein said input means receives outputs from two of the light receiving units, and
   said detection means detects coordinates of the light-shielded position on the basis of the outputs from the two of the light receiving unit in the second state.

11. A coordinate detection apparatus for detecting coordinates of a light-shielded position, comprising:
   light projecting means;
   light receiving means;

storage means for storing a first output value of said light receiving means in a first state in which said light projecting means projects light; and detection means for detecting an obstacle, which exists in the first state, based on the first output value of said light receiving means in the first state in which said light projecting means projects light;

for detecting abnormal light, which is projected from a light source other than said light projecting means and is input to said light receiving means, in a second state in which said light projecting means projects light, based on a second output value of said light receiving means in the second state, and for detecting coordinates of a light-shielded position in the second state based on the second output value of said light receiving means in the second state in which said light projecting means projects light, and the first output value stored in said storage means.

12. The apparatus according to claim 11, wherein said detection means detects a direction, in which abnormal light is projected, based on the output from said light receiving means in the state in which said light projecting means projects light.

13. The apparatus according to claim 11, wherein said detection means comprises warning means for warning detection of abnormal light.

14. A coordinate detection method for detecting coordinates of a light-shielded position in a coordinate detection apparatus having a light projection unit and a light receiving unit, comprising:

an obstacle detection step of detecting an obstacle, which exists in a first state, based on a first output from said light receiving means in the first state in which light projecting means projects light;

an abnormal light detection step of detecting abnormal light based on a second output from the light receiving unit in a state in which the light projecting unit does not project any light; and a coordinate detection step of detecting coordinates of a light-shielded position based on a third output from the light receiving unit in a second state in which the light projecting unit projects light.

15. The method according to claim 14, wherein in the abnormal light detection step, a direction in which the abnormal light is projected is detected based on the second output from the light receiving unit in the state in which the light projecting unit does not project any light.

16. The method according to claim 14, wherein in the abnormal light detection step, a position of a light source of abnormal light, which exists inside a coordinate input region, is detected based on the second output from the light receiving unit in the state in which the light projecting unit does not project any light.

17. The method according to claim 14, wherein the abnormal light detection step comprises a warning step of warning detection of the obstacle or abnormal light.

18. The method according to claim 14, further comprising:

a storage step of storing, in a storage medium, a first output value of the light receiving unit in the first state in which the light projecting unit projects light, wherein in the coordinate detection step, coordinates of a light-shielded position are detected based on the third output of the light receiving unit in the second state in which the light projecting unit projects light, and on the first output value stored in the storage medium in the storage step.

19. The method according to claim 14, wherein in the abnormal light detection step, abnormal light, which is projected from a light source other than the light projecting unit and is input to the light receiving unit, is detected based on an output from the light receiving unit in the state in which the light projecting unit projects light.

20. A coordinate detection method for detecting coordinates of a light-shielded position in a coordinate detection apparatus having a light projection unit and a light receiving unit, comprising:

a storage step of storing, in a storage medium, a first output value of the light receiving unit in a first state in which the light projecting unit projects light;

an obstacle detection step of detecting an obstacle, which exists in the first state, based on the first output value of the light receiving unit in the first state in which the light projecting unit projects light, an abnormal light detection step of detecting abnormal light, which is projected from a light source other than the light projecting unit and is input to the light receiving unit, in a second state in which the light projecting unit projects light, based on a second output value of the light receiving unit in the second state; and a coordinate detection step of detecting coordinates of a light-shielded position in the second state based on the second output value of the light receiving unit in the second state in which the light projecting unit projects light, and the first output value stored in the storage medium in the storage step.

21. The method according to claim 20, wherein in the abnormal light detection step, a direction in which abnormal light is projected is detected based on the output from the light receiving unit in the state in which the light projecting unit projects light.

22. The method according to claim 20, wherein the abnormal light detection step comprises a warning step of warning detection of abnormal light.

23. A storage medium storing a computer program for making a coordinate detection apparatus, having a light projection unit and a light receiving unit, detect coordinates of a light-shielded position, said computer program comprising:

an obstacle detection step of detecting an obstacle, which exists in a first state, based on a first output from said light receiving means in the first state in which light projecting means projects light;

an abnormal light detection step of detecting abnormal light based on a second output from the light receiving unit in a state in which the light projecting unit does not project any light; and a coordinate detection step of detecting coordinates of a light-shielded position based on a third output from the light receiving unit in a second state in which the light projecting unit projects light.

24. The medium according to claim 23, wherein in the abnormal light detection step, a direction in which the abnormal light is projected is detected based on the second output from the light receiving unit in the state in which the light projecting unit does not project any light.

25. The medium according to claim 23, wherein in the abnormal light detection step, a position of a light source of abnormal light, which exists inside a coordinate input region, is detected based on the second output from the light receiving unit in the state in which the light projecting unit does not project any light.

26. A storage medium storing a computer program for making a coordinate detection apparatus, having a light projection unit and a light receiving unit, detect coordinates of a light-shielded position, said computer program comprising:

a storage step of storing, in a storage medium, a first output value of the light receiving unit in a first state in which the light projecting unit projects light;

an obstacle detection step of detecting an obstacle, which exists in the first state, based on the first output value of the light receiving unit in the first state in which the light projecting unit projects light;

an abnormal light detection step of detecting abnormal light, which is projected from a light source other than the light projecting unit and is input to the light receiving unit, in a second state in which the light projecting unit projects light, based on a second output value of the light receiving unit in the second state; and a coordinate detection step of detecting coordinates of a light-shielded position in the second state based on the second output value of the light receiving unit in the second state in which the light projecting unit projects light, and the first output value stored in the storage medium in the storage step.

27. The medium according to claim 26, wherein in the abnormal light detection step, a direction in which abnormal light is projected, is detected based on the output from the light receiving unit in the state in which the light projecting unit projects light.

* * * * *